United States Patent
Marketkar et al.

(10) Patent No.: US 12,190,117 B2
(45) Date of Patent: Jan. 7, 2025

(54) SUPPRESSING ALLOCATION OF REGISTERS FOR REGISTER RENAMING

(71) Applicant: Advanced Micro Devices, Inc., Santa Clara, CA (US)

(72) Inventors: Neil N. Marketkar, Boxborough, MA (US); Arun A. Nair, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/697,147

(22) Filed: Nov. 26, 2019

(65) Prior Publication Data
US 2021/0157598 A1   May 27, 2021

(51) Int. Cl.
*G06F 9/38*   (2018.01)
*G06F 9/30*   (2018.01)

(52) U.S. Cl.
CPC .......... *G06F 9/384* (2013.01); *G06F 9/30101* (2013.01)

(58) Field of Classification Search
CPC ... G06F 9/384; G06F 9/30094; G06F 9/30101
USPC ....................................................... 712/217
See application file for complete search history.

(56) References Cited

U.S. PATENT DOCUMENTS

| | | | |
|---|---|---|---|
| 6,047,369 A * | 4/2000 | Colwell | G06F 9/30032 712/217 |
| 6,266,763 B1 * | 7/2001 | Witt | G06F 9/3013 711/210 |
| 6,279,101 B1 * | 8/2001 | Witt | G06F 9/3836 712/215 |
| 6,311,267 B1 | 10/2001 | Nguyen et al. | |
| 6,470,445 B1 * | 10/2002 | Arnold | G06F 9/3824 712/218 |
| 9,652,246 B1 | 5/2017 | Tam et al. | |
| 2003/0135715 A1 | 7/2003 | Jourdan et al. | |
| 2005/0071518 A1 * | 3/2005 | Samra | G06F 9/30094 710/1 |
| 2008/0077777 A1 * | 3/2008 | Lataille | G06F 9/384 712/217 |
| 2008/0177983 A1 | 7/2008 | Piry et al. | |
| 2008/0177984 A1 | 7/2008 | Lataille et al. | |
| 2014/0019728 A1 | 1/2014 | Reid | |
| 2015/0019843 A1 * | 1/2015 | Krishna | G06F 9/3855 712/217 |
| 2019/0129717 A1 * | 5/2019 | Alexander | G06F 9/3857 |

* cited by examiner

*Primary Examiner* — Keith E Vicary
(74) *Attorney, Agent, or Firm* — Volpe Koenig

(57) ABSTRACT

Techniques are provided for allocating registers for a processor. The techniques include identifying a first instruction of an instruction dispatch set that meets all register allocation suppression criteria of a first set of register allocation suppression criteria, suppressing register allocation for the first instruction, identifying a second instruction of the instruction dispatch set that does not meet all register allocation suppression criteria of a second set of register allocation suppression criteria, and allocating a register for the second instruction.

15 Claims, 5 Drawing Sheets

FIG. 3

| Instructions - Program Order | | | 300 |
|---|---|---|---|
| Instruction # | Output | Inputs | |
| 1 | R3 | R1 | R2 |
| 2 | R1 | R3 | R4 |
| 3 | R3 | R5 | R7 |
| 4 | R4 | R3 | R2 |

| Register Renaming | | | 310 |
|---|---|---|---|
| Instruction # | Output | Inputs | |
| 1 | R3←PhysReg3 | R1→PhysReg1 | R2→PhysReg2 |
| 2 | R1←PhysReg10 | R3→PhysReg3 | R4→PhysReg4 |
| 3 | R3←PhysReg11 | R5→PhysReg5 | R7→PhysReg7 |
| 4 | R4←PhysReg12 | R3→PhysReg11 | R2→PhysReg2 |

| First Dispatch to Functional Units | | | 320 |
|---|---|---|---|
| Instruction # | Output | Inputs | |
| 1 | PhysReg3 | PhysReg1 | PhysReg2 |
| 3 | PhysReg11 | PhysReg5 | PhysReg7 |
| Held Back Due to Dependencies: | | | |
| 2 | PhysReg10 | *Dep: Instruction 1 PhysReg3* | PhysReg4 |
| 4 | PhysReg12 | *Dep: Instruction 3 PhysReg11* | PhysReg2 |

| Second Dispatch to Functional Units | | | 330 |
|---|---|---|---|
| Instruction # | Output | Inputs | |
| 2 | PhysReg10 | PhysReg3 | PhysReg4 |
| 4 | PhysReg12 | PhysReg11 | PhysReg2 |

SUPPRESSING ALLOCATION OF REGISTERS FOR REGISTER RENAMING

BACKGROUND

Register renaming is a technique that allows instructions that have certain architectural register dependencies to nonetheless execute out-of-order in an out-of-order processor. More specifically, register renaming eliminates false dependencies, so that only true read-after-write data dependencies remain. Write-after-write and write-after-read are false dependencies.

According to register renaming, instructions are allocated free physical registers in a register file to write instruction results to. Moreover, two instructions that write to the same architectural register are allocated different physical registers. If these two instructions have no read-after-write data dependencies, the two instructions are able to be dispatched out of order. Although register renaming provides certain benefits, the depth of speculative execution is limited by, among other things, the number of physical registers available for allocation.

BRIEF DESCRIPTION OF THE DRAWINGS

A more detailed understanding may be had from the following description, given by way of example in conjunction with the accompanying drawings wherein:

FIG. 3 illustrates example phases related to register renaming;

DETAILED DESCRIPTION

Techniques are provided for allocating registers for a processor. The techniques include identifying a first instruction of an instruction dispatch set that meets all register allocation suppression criteria of a first set of register allocation suppression criteria, suppressing register allocation for the first instruction, identifying a second instruction of the instruction dispatch set that does not meet all register allocation suppression criteria of a second set of register allocation suppression criteria, and allocating a register for the second instruction.

Figure 1:
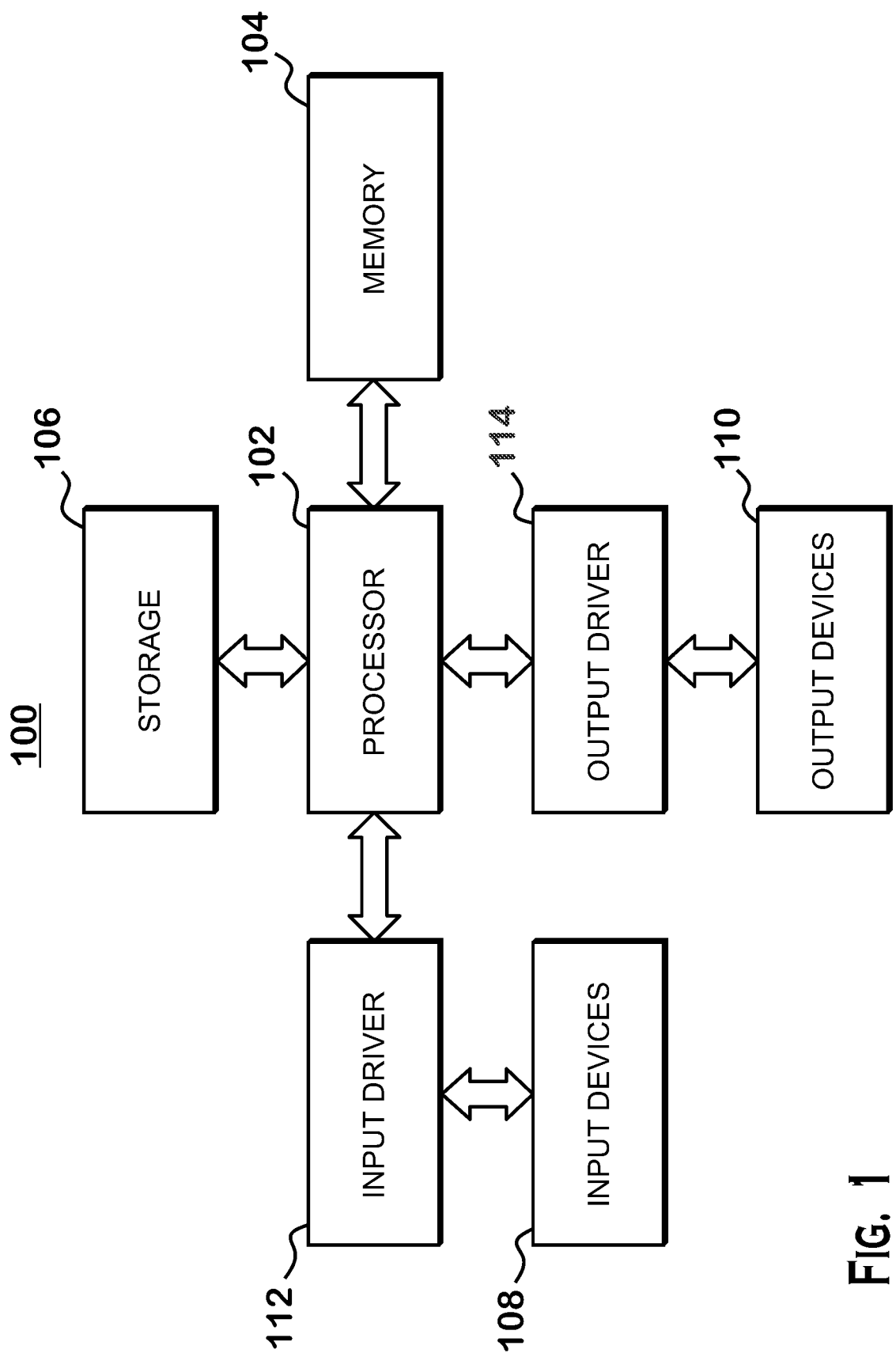
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
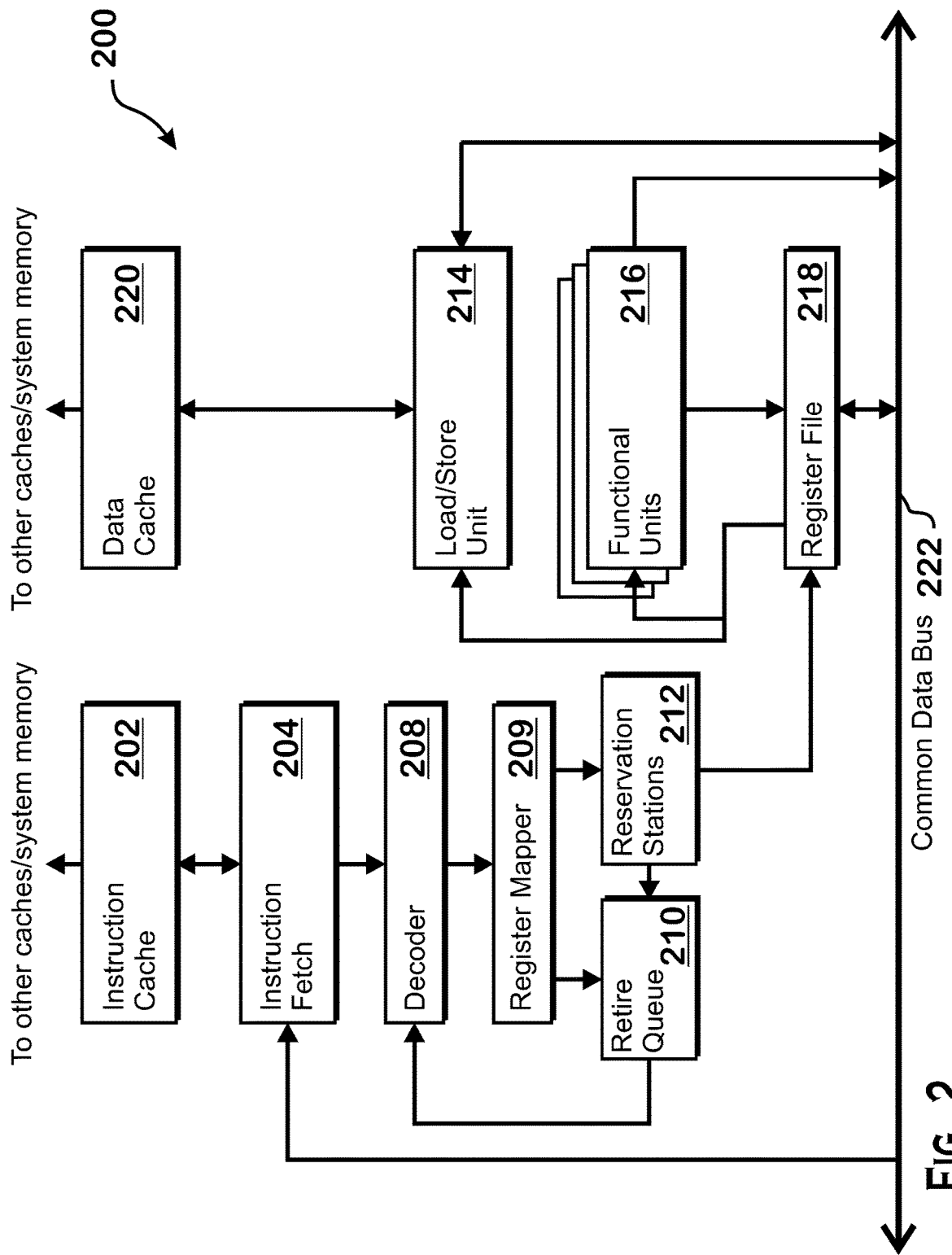
FIG. 2 is a block diagram of an instruction execution pipeline, located within the processor of FIG. 1.

FIG. 2 is a block diagram of an instruction execution pipeline 200, located within the processor 102 of FIG. 1. Although one specific configuration for an instruction execution pipeline 200 is illustrated, it should be understood that a wide variety of instruction execution pipelines fall within the scope of the present disclosure. The instruction execution pipeline 200 retrieves instructions from memory and executes the instructions, outputting data to memory and modifying the state of elements associated with the instruction execution pipeline 200, such as registers within register file 218.

The instruction execution pipeline 200 includes an instruction fetch unit 204 that fetches instructions from system memory (such as memory 104) using an instruction cache 202, a decoder 208 that decodes fetched instructions, functional units 216 that perform calculations to process the instructions, a load store unit 214 that loads data from or stores data to system memory via a data cache 220, and a register file 218, which includes registers that store working data for the instructions.

The decoder 208 generates micro-operations and dispatches the micro-operations to the retire queue 210. Note, herein the term "instructions," when referring to instructions after decode, is sometimes used interchangeably with the term "micro-operations." In other words, it is sometimes stated that a particular unit past the decoder stage 208 performs certain actions with respect to instructions, and in these instances, the word "instruction" refers to the micro-operations output by the decoder stage 208.

A register mapper 209 maps the architectural registers specified by the instructions output by the decoder 208 to physical registers of the register file 218. The register mapper 209 maps free registers of the register file 218 to the architectural registers written to by instructions. The register mapper 209 also maintains a table indicating which architectural registers are mapped to which physical registers and uses this table to map the input registers of instructions to the correct physical registers. The register mapper 209 frees a physical register in response to the following actions for the instruction for which the physical register was allocated: a new physical register is allocated for the architectural register mapped to the physical register to be freed; and the instruction that causes that new physical register to be allocated, itself retires. In other words, a physical register is freed in response to the value of the physical register no longer being needed by instructions. This value is no longer needed when the architectural register is overwritten and the instruction that overwrote the architectural register retires.

A retire queue 210 tracks instructions that are currently in-flight and ensures in-order retirement of instructions despite allowing out-of-order execution while in-flight. The term "in-flight instructions" refers to instructions that have been received by the retire queue 210 but have not yet retired. Retirement occurs when an instruction has completed (performed all operations in the functional units 216 and/or load/store unit 214) and is not or no longer executing speculatively. Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the retire queue 210 and are retired when at the head of the retire queue 210. Retirement refers to the act of committing results of an instruction to the architectural state of the processor. It is possible, for example, for instructions to execute speculatively and out of order. If speculation fails, the instruction does not retire and is instead flushed from the pipeline 200. At point of retirement, an instruction is, in most cases, considered to no longer be speculatively executing, and thus results of that instruction are "committed" to the state of the pipeline 200.

Various elements of the instruction execution pipeline 200 communicate via a common data bus 222. For example, the functional units 216 and load/store unit 214 write results to the common data bus 222 which may be read by reservation stations 212 for execution of dependent instructions and by the retire queue 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

FIG. 3 illustrates example phases related to register renaming. A first phase 300 illustrates instructions in program order, and illustrates architectural registers, rather than physical registers. Four example instructions are illustrated. Instruction 1 inputs the values at architectural registers R1 and R2 and outputs a value to architectural register R3. Instruction 2 inputs values at architectural registers R3 and R4 and outputs a value to architectural register R1. Instruction 3 inputs values at architectural registers R5 and R7 and outputs a value to architectural register R3. Instruction 4 inputs values at architectural registers R3 and R2 and outputs a value to architectural register R4.

Register renaming for these illustrated instructions is shown in the register renaming phase 310. In this phase, the architectural register written to by each instruction is allocated in a physical register file. For instruction 1, the register mapper 209 allocates physical register PhysReg3 to architectural register R3. For instruction 2, the register mapper 209 allocates physical register PhysReg10 to architectural register R1. For instruction 3, the register mapper 209 allocates physical register PhysReg11 to architectural register R3. For instruction 4, the register mapper 209 allocates physical register PhysReg12 to architectural register R4.

Note that although the architectural register written to by instruction 3 is the same as the architectural register written to by instruction 1, the physical registers used are different. This difference allows instructions 1 and 3 to execute out of program order with respect to each other. For example, the pipeline 200 could execute instruction 3 before instruction 1 or instruction 2. More specifically, the value written to architectural register R3 by instruction 1 is not consumed after instruction 2, since instruction 3 overwrites that architectural register. Thus instruction 3 and subsequent instructions refer to a different physical register than the physical register mapped to architectural register R3 for instruction 1.

For the register inputs, the register mapper 209 maps the physical registers that hold the values to be read to the input architectural registers. Due to the small sample size of the instructions illustrated in the example of FIG. 3, the origin of data for architectural registers R1, R2, R4, R5, and R7 is not shown. However, in the example, it is presumed that the physical registers mapped to those architectural registers were generated in previous instructions not shown and placed into the physical registers mapped to those architectural registers as illustrated in FIG. 3. Thus, for example, the value for architectural register R1 was placed into physical register PhysReg1 and therefore R1 is mapped to physical register PhysReg1. For similar reasons, architectural registers R2, R4, R5, and R7 are mapped to physical registers PhysReg2, PhysReg4, PhysReg5, and PhysReg7, respectively. It is possible for the register mapper 209 to use default registers for architectural registers that have not yet been written to.

In some situations, the input value for a younger illustrated instruction is the same as the output value of an older illustrated instruction. In those situations, the architectural register holding the input value for the younger instruction is mapped to the physical register that holds the output of the older instruction. In the example illustrated, instruction 2 reads from architectural register R3, which holds a value generated by instruction 1. Thus in instruction 2, architectural register R3 is mapped to physical register PhysReg3, which is the physical register allocated to instruction 1 and mapped to architectural register R3 for instruction 1. In addition, instruction 4 reads from the value written into architectural R3 by instruction 3. In instruction 3, architectural register R3 is mapped to physical register PhysReg11 and therefore in instruction 4, architectural register R3 is mapped to PhysReg11.

After the register mapping, the reservation stations 212 cause the instructions to be dispatched to the functional units 216 and/or load/store unit 214. The first dispatch 320 includes instructions 1 and 3 because instructions 2 and 4 have data dependencies and thus cannot begin execution until those data dependencies are satisfied. Note that instructions 1 and 3 are dispatched together even though instructions 1 and 3 write to the same architectural register. The register renaming allows these instructions to be dispatched together. After the data dependencies are satisfied, in the second dispatch 330, instructions 2 and 4 are dispatched.

While register renaming is important for proper functioning of out-of-order processors, in some situations, register renaming can result in pressure on the register file 218. Here, the term "pressure" refers to a large number of allocated registers due to a large number of in-flight instructions. Additionally, in some situations, some of allocations are unnecessary because the value written is never consumed. Reducing the allocations in such situations thus improves the register file usage, which reduces stalls, thereby increasing performance. Reducing allocations also lowers the register file power since there are fewer writes.

One aspect of instruction execution associated with register pressure due to register renaming is writing flags to flags registers. Flags are values that indicate inter-instruction state. There are many examples of flags, but some include a carry flag, which indicates whether there is a carry in the most significant arithmetic logic unit bit position in the result of an operation, a parity flag that indicates whether the last result was even or odd, a zero flag that indicates whether the result of the last operation was zero, a sign flag that indicates the sign of the last operation, and many other flags, such as those that are specified in the FLAGS register in the x86 instruction set architecture. In general, most or all arithmetic logic unit ("ALU") instructions, such as add, subtract, and the like, write to the flags register. Thus, in architectures that allocate a physical flags register separately from data registers, each ALU instruction allocates a new flags register. In many instances, the writes to the flags register that are performed are never consumed, and so such allocations are wasted.

Figure 4:
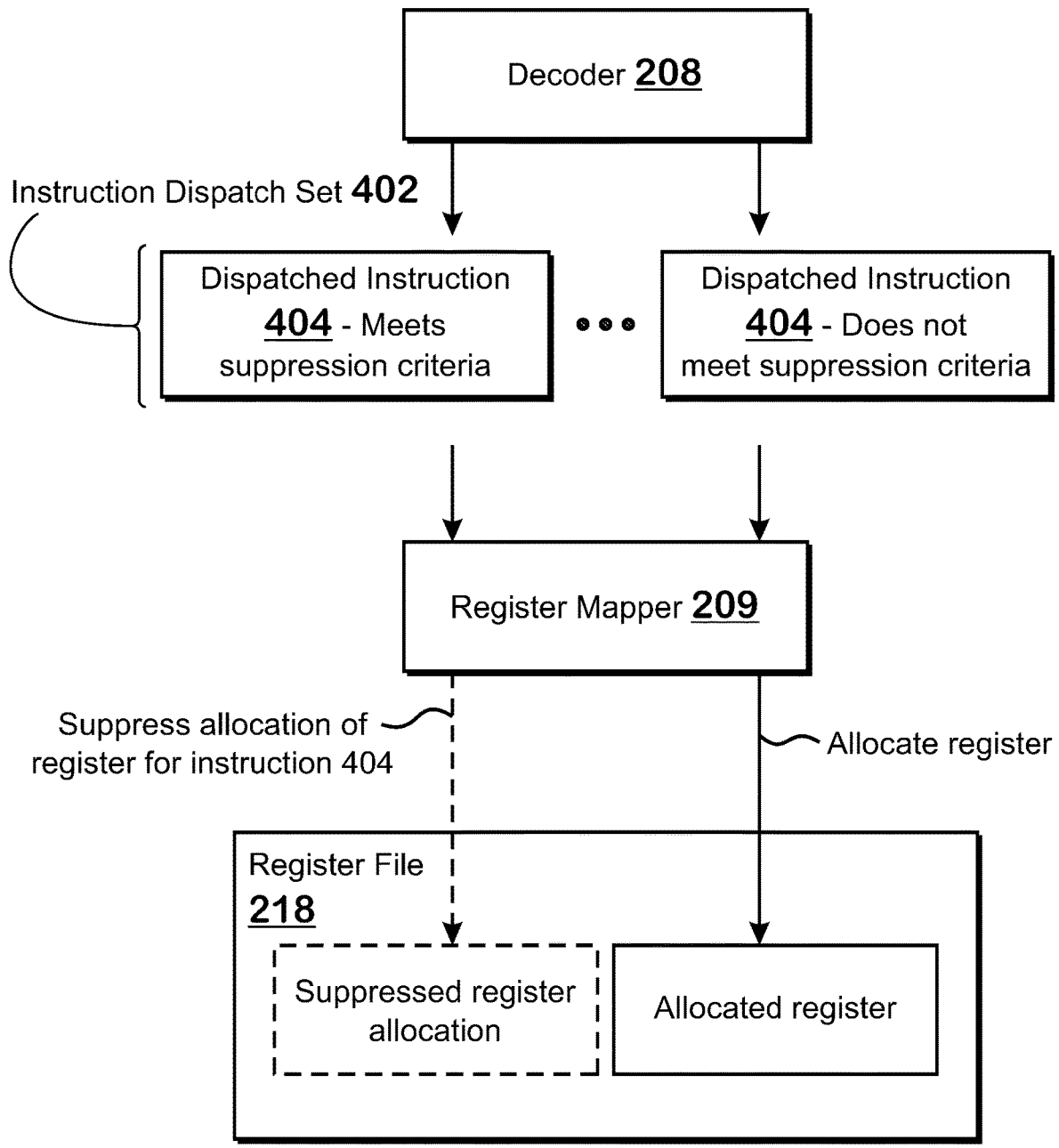
FIG. 4 illustrates a technique for physical register allocation to reduce register file pressure, according to an example.

FIG. 4 illustrates a technique for physical register allocation to reduce register file pressure, according to an example. In FIG. 4, the decoder 208 generates and dispatches an instruction dispatch set 402. The instruction dispatch set 402 includes multiple instructions 404. In some implementations, this instruction dispatch set 402 is generated in a single cycle. Thus, in some instances, the decoder 208 dispatches multiple instructions per cycle. In some implementations, the instruction dispatch set 402 is generated across multiple cycles and thus the operations performed by the register mapper 209 are performed across multiple cycles. In some implementations, the instruction dispatch set 402 includes instructions 404 that are consecutive in program order, with no intervening instructions. In one example, the instruction dispatch set 402 includes two back-to-back instructions 404 in program order, which allows the register mapper 209 a chance to suppress allocation for the older of these two instructions 404.

To perform a technique for register allocation to reduce register file pressure, the register mapper 209 detects that at least one instruction of the instruction dispatch set 402 meets a set of allocation suppression criteria. The set of allocation suppression criteria for an instruction includes the following. A first criterion is that the instruction 404 is not the youngest instruction 404 of the instruction dispatch set 402. A second criterion is that the instruction writes flags that are all overwritten by younger instructions 404 of the instruction dispatch set 402. A third criterion is that no younger instruction 404 of the instruction dispatch set 402 reads any of the flags written by the instruction 404. If all criteria of the set of allocation suppression criteria are met for the instruction 404, then the register mapper 209 suppresses allocation of a flags register for the instruction 404. If at least one criterion of the set of allocation suppression criteria is not met for the instruction 404, then the register mapper 209 does not suppress allocation of a flags register for the instruction 404 and allocates a flags register for that instruction 404.

To provide more detail for the above explanation, it is possible for different instructions to write different flags. In an example, an addition instruction writes a set of flags including the carry flag, the zero flag, and the parity flag. A subtract instruction writes those same flags. In an example where the instruction dispatch set 402 includes two consecutive instructions 404 (and not more than two instructions), the two consecutive instructions 404 write the same flags and the younger instruction 404 does not read any of the flags written by the older instruction 404. In this example, the flag writes of the first instruction 404 are suppressed because such flags will never be used. In another example of two consecutive instructions 404, the older instruction 404 writes a set of flags and the younger instruction 404 writes a superset of flags that includes the set of flags written by the older instruction 404. In addition, the younger instruction 404 does not read any of the flags written by the older instruction 404. In this example, the flag writes of the older instruction are suppressed because these flag writes are never used. In another example, the older instruction 404 writes a set of flags and the younger instruction 404 does not write all of the flags written by the older instruction 404. In this example, the flag writes are not suppressed for the older instruction 404. In yet another example, the younger instruction 404 and the older instruction 404 write the same flags but the younger instruction reads at least one of the flags of the older instruction 404. In this example, the flag writes of the older instruction 404 are not suppressed. In the above, a statement that flag writes are suppressed means, in some implementations, that a register is not allocated for the flags to be written. In other implementations, this statement means that the flag writes are not performed.

As described above, in situations in which an instruction 404 meets a set of allocation suppression criteria, register allocation for the instruction 404 is suppressed. The effect of not allocating a flags register for any particular instruction 404 is that that instruction 404 does not write any of its flags and also that the register file pressure is reduced as compared with a scenario in which the technique of FIG. 4 is not used.

In some implementations, the flags register has a separate rename space from the data registers. A separate rename space means that the register mapper 209 allocates physical registers to the architectural flags register independently of the physical registers that are mapped to the data registers. This is contrasted with a configuration in which each time a data register is allocated, space for flags are allocated as well (the register ("entries") in the register file 218 include space for both data registers and flags registers). In the implementations where the flags register has the separate rename space from the data registers, a technique for not allocating a flags register, described above, is applied when flags are written in conjunction with instructions that perform tasks in addition to writing flags (such as ALU instructions) and also for instructions that write flags and not data registers.

In other implementations, flags registers have the same rename space as the data registers. In such implementations, entries in the register file include space for both a data register and a flags register. Thus when an instruction that performs operations including writing the flags as well as writing a data register is executed, space in the register file is allocated for the data register and the flags register together as a single unit. In such implementations, it is sometimes possible to reduce register file pressure through suppressing register allocations. However, in some situations, it is not possible to reduce register file pressure even for an instruction that meets all of the register allocation suppression criteria.

More specifically, in some situations, an older instruction 404 writes only flags and not data. Additionally, the older instruction 404 meets all the register allocation suppression criteria with respect to a younger instruction 404 that either writes only flags or writes flags and data. In this situation, the allocation for the older instruction 404 is suppressed because the entire register file entry for that instruction 404 is not used. Specifically, the instruction 404 does not write data and the flags the instruction 404 would write would never be used.

However, in other situations, an older instruction writes data and flags. Additionally, the older instruction 404 meets all the register allocation suppression criteria (for flags) with respect to a younger instruction 404 that writes only flags or writes flags and data. In this situation, the allocation for the older instruction 404 is not suppressed because an entry in the register file is needed for the data of the older instruction 404. However, in this situation, the write of the flags for the older instruction 404 is suppressed because those flags are never used.

It is possible to apply the register suppression technique to registers other than the flags registers. More specifically, instead of the register mapper 209 determining whether one or more instructions 404 in an instruction dispatch set 402 meet the register allocation suppression criteria with respect to flags, the register mapper 209 determines whether one or more instructions 404 in an instruction dispatch set 402 meet the register allocation suppression criteria with respect to data. For the second criterion listed elsewhere herein, this criterion is that the instruction writes to a data register that is overwritten by at least one younger instruction 404 of the instruction dispatch set 402. For the third criterion listed elsewhere herein, this criterion is that no younger instruction 404 of the instruction dispatch set 402 reads the register under consideration. For instructions 404 that meet the register allocation suppression criteria, the register allocation is suppressed.

Figure 5:
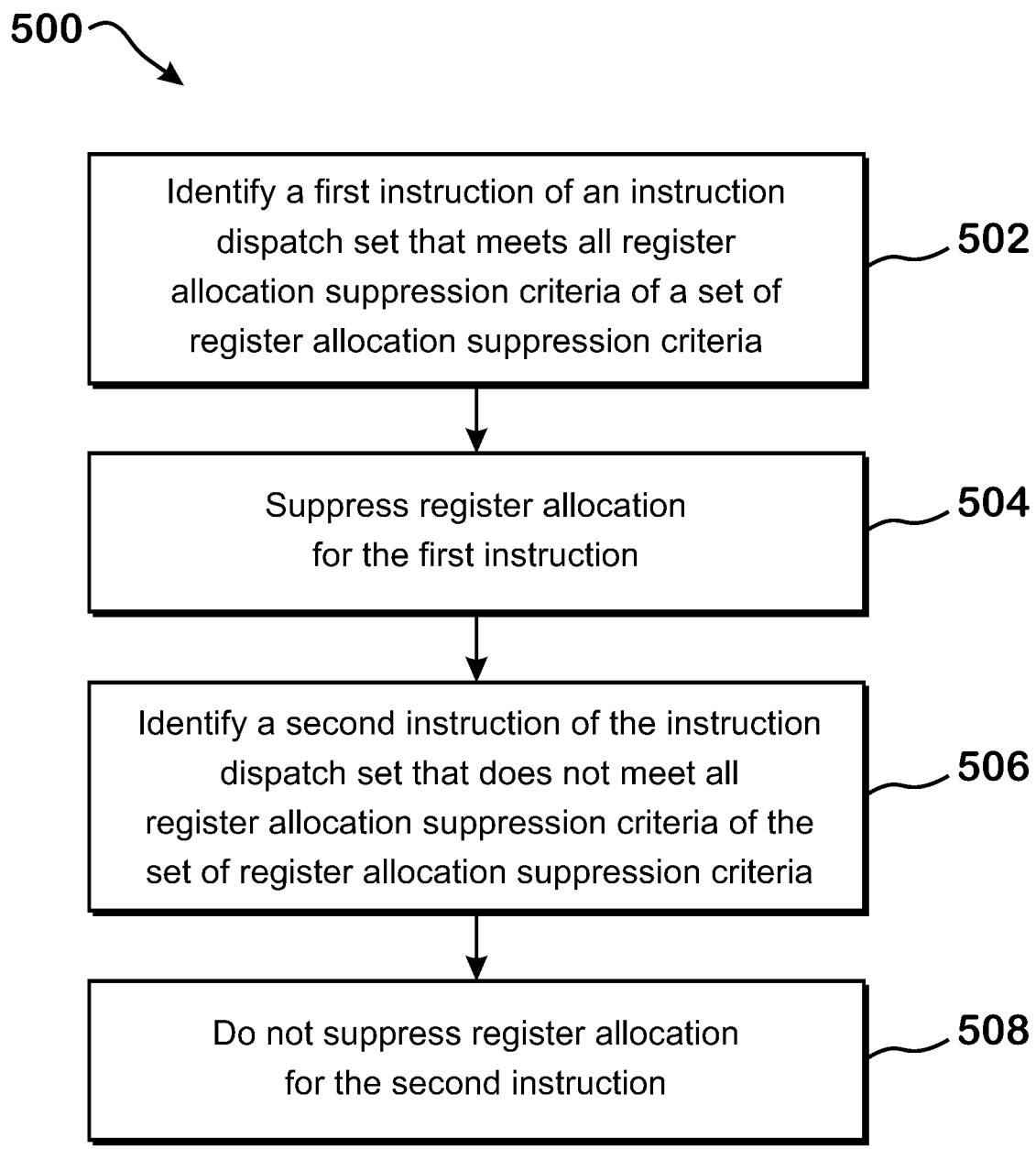
FIG. 5 is a flow diagram of a method for allocating physical registers in a register file to instructions, according to an example.

FIG. 5 is a flow diagram of a method 500 for allocating physical registers in a register file to instructions, according to an example. Although the method 500 is described with respect to the system of FIGS. 1-4, those of skill in the art will recognize that any system configured to perform the steps of method 500 in any technically feasible order falls within the scope of the present disclosure.

The method 500 begins at step 502, where the register mapper 209 identifies a first instruction of an instruction dispatch set 402 that meets all register allocation suppression criteria of a set of register allocation suppression criteria. A set of register allocation criteria is described elsewhere herein. An instruction dispatch set 402 is also described elsewhere herein.

At step 504, because the first instruction meets all register allocation suppression criteria, the register mapper 209 suppresses register allocation for the first instruction. As described elsewhere herein, in a separate register rename space register file, suppressing register allocation for a flags register for the first instruction means that a flags register that would be allocated for the first instruction is not allocated to that instruction and therefore that at least one additional register is available for use by a different instruction. As described elsewhere herein, in a non-separate namespace register file, where flags and data share slots in the register file, suppressing register allocation means either suppressing the allocation of an entire register file slot or not writing a portion of a register file slot where another portion of the register file slot is still used for another purpose (e.g., data).

At step 506, the register mapper 209 identifies a second instruction of the instruction dispatch set that does not meet all of the register allocation suppression criteria of the set of register allocation suppression criteria. At step 508, in response to step 506, the register mapper 209 does not suppress register allocation for the second instruction.

In some implementations, method 500 is performed to determine whether to suppress flag register allocation. In other implementations, method 500 is performed to determine whether to suppress data register allocation.

In some implementations, in some situations, a register allocation is suppressed but the instruction pipeline 200 later determines that the register value that would have been written is needed. One example of such a situation is where an instruction in an instruction dispatch set 402 has a register allocation suppressed but the instruction pipeline 200 detects that an exception occurs and therefore needs the value that is not written. In such situations, the instruction pipeline 200 flushes the instruction and replays the instruction without suppressing the write.

In some implementations, an additional criterion of the register allocation suppression criteria is that the instruction for which the criteria are being tested is not a branch instruction.

It should be understood that many variations are possible based on the disclosure herein. Although features and elements are described above in particular combinations, each feature or element may be used alone without the other features and elements or in various combinations with or without other features and elements.

The various functional units illustrated in the figures and/or described herein (including, where appropriate, the processor 102, the input driver 112, the input devices 108, the output driver 114, the output devices 110, the instruction cache 202, the instruction fetch unit 204, the decoder 208, the register mapper 209, the retire queue 210, the reservation stations 212, the data cache 220, the load/store unit 214, the functional units 216, the register file 218, and the common data bus 222) may be implemented as hardware circuitry, software executing on a programmable processor, or a combination of hardware and software. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for allocating registers for a processor, the method comprising:

in response to a first instruction from among an instruction dispatch set meeting all register allocation suppression criteria of a set of register allocation suppression criteria, wherein the set of register allocation suppression criteria includes a requirement that the first instruction writes flags that are to be overwritten by one or more younger instructions of the instruction dispatch set, suppressing allocation of a flags register for the first instruction;

executing the first instruction that meets the set of register allocation suppression criteria, resulting in data being generated and stored in a data register; and in response to a second instruction from among the instruction dispatch set not meeting all of the register allocation suppression criteria, allocating a flags register for the second instruction.

2. The method of claim 1, wherein:
the set of register allocation suppression criteria includes a requirement that the first instruction is not a youngest instruction of the instruction dispatch set.

3. The method of claim 1, wherein:
the set of register allocation suppression criteria further includes a requirement that the first instruction is not a youngest instruction of the instruction dispatch set and a requirement that prohibits an instruction from the instruction dispatch set that is younger than the first instruction from reading any flag written by the first instruction.

4. The method of claim 1, wherein:
the set of register allocation suppression criteria includes a requirement that prohibits an instruction from the instruction dispatch set that is younger than the first instruction from reading any flag written by the first instruction.

5. The method of claim 1, wherein the instruction dispatch set includes instructions that are consecutive, without intervening instructions, in program order.

6. An instruction processing subsystem for allocating registers for a processor, the instruction processing subsystem comprising:
a decode unit circuit configured to dispatch an instruction dispatch set; and
a circuit, configured to:
in response to a first instruction from among the instruction dispatch set meeting all register allocation suppression criteria of a set of register allocation suppression criteria, wherein the set of register allocation suppression criteria includes a requirement that the first instruction writes flags that are to be overwritten by one or more younger instructions of the instruction dispatch set, suppress allocation of a flags register for the first instruction;
execute the first instruction that meets the set of register allocation suppression criteria, resulting in to generate data being generated and that is stored in a data register; and
in response to a second instruction from among the instruction dispatch set not meeting all of the register allocation suppression criteria, allocate a flags register for the second instruction.

7. The instruction processing subsystem of claim 6, wherein:
the set of register allocation suppression criteria includes a requirement that the first instruction is not a youngest instruction of the instruction dispatch set.

8. The instruction processing subsystem of claim 6, wherein:
the set of register allocation suppression criteria further includes a requirement that the first instruction is not a youngest instruction of the instruction dispatch set and a requirement that prohibits an instruction from the instruction dispatch set that is younger than the first instruction from reading any flag written by the first instruction.

9. The instruction processing subsystem of claim 6, wherein:
the set of register allocation suppression criteria includes a requirement that prohibits an instruction from the instruction dispatch set that is younger than the first instruction from reading any flag written by the first instruction.

10. The instruction processing subsystem of claim 6, wherein the instruction dispatch set includes instructions that are consecutive, without intervening instructions, in program order.

11. A processor for allocating registers for the processor, the processor comprising:
a decode unit circuit configured to dispatch an instruction dispatch set;
a register mapper circuit, configured to:
in response to a first instruction from among the instruction dispatch set meeting all register allocation suppression criteria of a set of register allocation suppression criteria, wherein the set of register allocation suppression criteria includes a requirement that the first instruction writes flags that are to be overwritten by one or more younger instructions of the instruction dispatch set, suppress allocation of a flags register for the first instruction; and
in response to a second instruction from among the instruction dispatch set not meeting all of the register allocation suppression criteria, allocate the flags register for the second instruction; and
one or more functional units configured to execute both of the first instruction and the second instruction, wherein executing the first instruction that meets the set of register allocation suppression criteria results in data being generated and stored in a data register.

12. The processor of claim 11, wherein:
the set of register allocation suppression criteria includes a requirement that the first instruction is not a youngest instruction of the instruction dispatch set.

13. The processor of claim 11, wherein:
the set of register allocation suppression criteria further includes a requirement that the first instruction is not a youngest instruction of the instruction dispatch set and a requirement that prohibits an instruction from the instruction dispatch set that is younger than the first instruction from reading any flag written by the first instruction.

14. The processor of claim 11, wherein:
the set of register allocation suppression criteria includes a requirement that prohibits an instruction from the instruction dispatch set that is younger than the first instruction from reading any flag written by the first instruction.

15. The processor of claim 11, wherein the instruction dispatch set includes instructions that are consecutive, without intervening instructions, in program order.

* * * * *